United States Patent
Yu et al.

(10) Patent No.: US 9,626,577 B1
(45) Date of Patent: Apr. 18, 2017

(54) IMAGE SELECTION AND RECOGNITION PROCESSING FROM A VIDEO FEED

(71) Applicant: Amazon Technologies, Inc., Reno, NV (US)

(72) Inventors: Qingfeng Yu, Belmont, MA (US); Yue Liu, Brighton, MA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 226 days.

(21) Appl. No.: 14/486,509

(22) Filed: Sep. 15, 2014

(51) Int. Cl.
  G06K 9/46 (2006.01)
  G06K 9/18 (2006.01)
  G06K 9/62 (2006.01)

(52) U.S. Cl.
  CPC ............... *G06K 9/18* (2013.01); *G06K 9/46* (2013.01); *G06K 9/6267* (2013.01); *G06K 2009/4666* (2013.01)

(58) Field of Classification Search
  None
  See application file for complete search history.

(56) References Cited

U.S. PATENT DOCUMENTS

| | | | | |
|---|---|---|---|---|
| 9,418,316 | B1* | 8/2016 | Liu | G06K 9/3258 |
| 2009/0073266 | A1* | 3/2009 | Abdellaziz Trimeche | G06T 7/401 348/180 |
| 2009/0316999 | A1* | 12/2009 | Kim | G06K 9/228 382/209 |
| 2012/0243732 | A1* | 9/2012 | Swaminathan | G06T 7/0042 382/103 |
| 2015/0112853 | A1* | 4/2015 | Hegarty | G06Q 40/025 705/38 |

* cited by examiner

*Primary Examiner* — Bernard Krasnic
(74) *Attorney, Agent, or Firm* — Seyfarth Shaw LLP; Ilan N. Barzilay; Christopher A. Baxter (57) ABSTRACT

A system that selects image frames from a video feed for recognition of objects (such as physical objects, text characters, or the like) within the image frames. The individual frames are selected using robust historical metrics that compare individual metrics of the particular image (such as focus, motion, intensity, etc.) to similar metrics of previous image frames in the video feed. The system will select the image frame for object recognition if the image frame is relatively high quality, that is the image frame is suitable for a later object recognition processing.

16 Claims, 7 Drawing Sheets

FIG. 2

$$\text{Mean}_{Focus} = \frac{\sum_{frame=X-N}^{X} \text{Focus}_{(frame)}}{N} \qquad \text{STD}_{Focus} = \sqrt{\frac{\sum(\text{Focus}_{(frame)} - \text{Mean}_{Focus})^2}{N-1}}$$

$$\text{Mean}_{Motion} = \frac{\sum_{frame=X-N}^{X} \text{Motion}_{(frame)}}{N} \qquad \text{STD}_{Motion} = \sqrt{\frac{\sum(\text{Motion}_{(frame)} - \text{Mean}_{Motion})^2}{N-1}}$$

$$\text{Mean}_{Contrast} = \frac{\sum_{frame=X-N}^{X} \text{Contrast}_{(frame)}}{N} \qquad \text{STD}_{Contrast} = \sqrt{\frac{\sum(\text{Contrast}_{(frame)} - \text{Mean}_{Contrast})^2}{N-1}}$$

$$\text{HIST}_{Focus} = \frac{\text{STD}_{Focus}}{\text{MEAN}_{Focus}} \qquad \text{HIST}_{Motion} = \frac{\text{STD}_{Motion}}{\text{MEAN}_{Motion}} \qquad \text{HIST}_{Contrast} = \frac{\text{STD}_{Contrast}}{\text{MEAN}_{Contrast}}$$

"IMAGE SELECTION AND RECOGNITION PROCESSING FROM A VIDEO FEED"

BACKGROUND

Mobile electronic devices such as tablet computers and smart phones commonly include cameras. Software on the mobile device may process captured images to identify and recognize text and glyph symbols.

BRIEF DESCRIPTION OF DRAWINGS

For a more complete understanding of the present disclosure, reference is now made to the following description taken in conjunction with the accompanying drawings.

DETAILED DESCRIPTION

Recognizing text or objects in images captured from hand-held cameras in cellphones, tablets, and wearable computers is a challenging task. Such images suffer from a variety of degradations including focus problems, motion artifacts, illumination variations, orientation changes, etc. Adding to the challenge, is that images taken from a mobile device may come from a series of sequential images, such as a video stream where each image is a frame of the video stream. These incoming images need to be sorted to determine which images will be selected for further object recognition processing. Further, the recognition may be a process that is being performed while a user points a device's camera at an object or text. To avoid an undesirable user experience, the time to perform the complete recognition process, from first starting the video feed to delivering results to the user, should be as short as possible. As images in a video feed may come in rapid succession, an image processing system should be able to select or discard an image quickly so that the system can, in turn, quickly process the selected image and deliver results to a user.

One way of selecting an image for object recognition is to compute a metric/feature for each frame in the video feed and to select an image for processing if the metric exceeds a certain threshold. Typically these values may be only computed based on the frame itself, or may be computed based on the frame or a pair of adjacent frames. For example, a system may compute a focus metric, which measures a focus level of the image. If the focus metric exceeds a certain value, the image may be selected. Other metrics may also be used, for example a motion metric that measures an amount of motion detected in the image (which may also use information from a pair of adjacent frames), a contrast metric that measures the contrast of the image, a brightness metric that measures brightness in the image, or the like. In another method, the image may be selected based on multiple metrics and their exceeding their respective thresholds.

One problem with measuring and selecting an image individually, is that metrics measuring a single image are not robust, in that they are prone to fluctuation among different images of a video feed. These fluctuations may not be apparent or accounted for if only a single image is considered at a time. As a result noise that may be present in individual images (and the metrics associated with them) may not be filtered when using a single image. Further, in order to use thresholds, the threshold must be selected in some manner. Selecting a threshold that will work in multiple types of images (i.e. close ups v. wide shots, low light v. high light, outdoors v. indoors) is very difficult. Other problems also exist.

An improved system and method selection and processing of images for eventual object or text recognition is offered and discussed below. In the present system, one or more robust historical metrics are used to select one or more images for recognition processing. The historical metrics are representations of certain metric values for the image compared to the values for that metric for a group of different images in the same video feed. The historical metric(s) may be processed using a trained classifier model to select which images are suitable for later processing.

Figure 1:
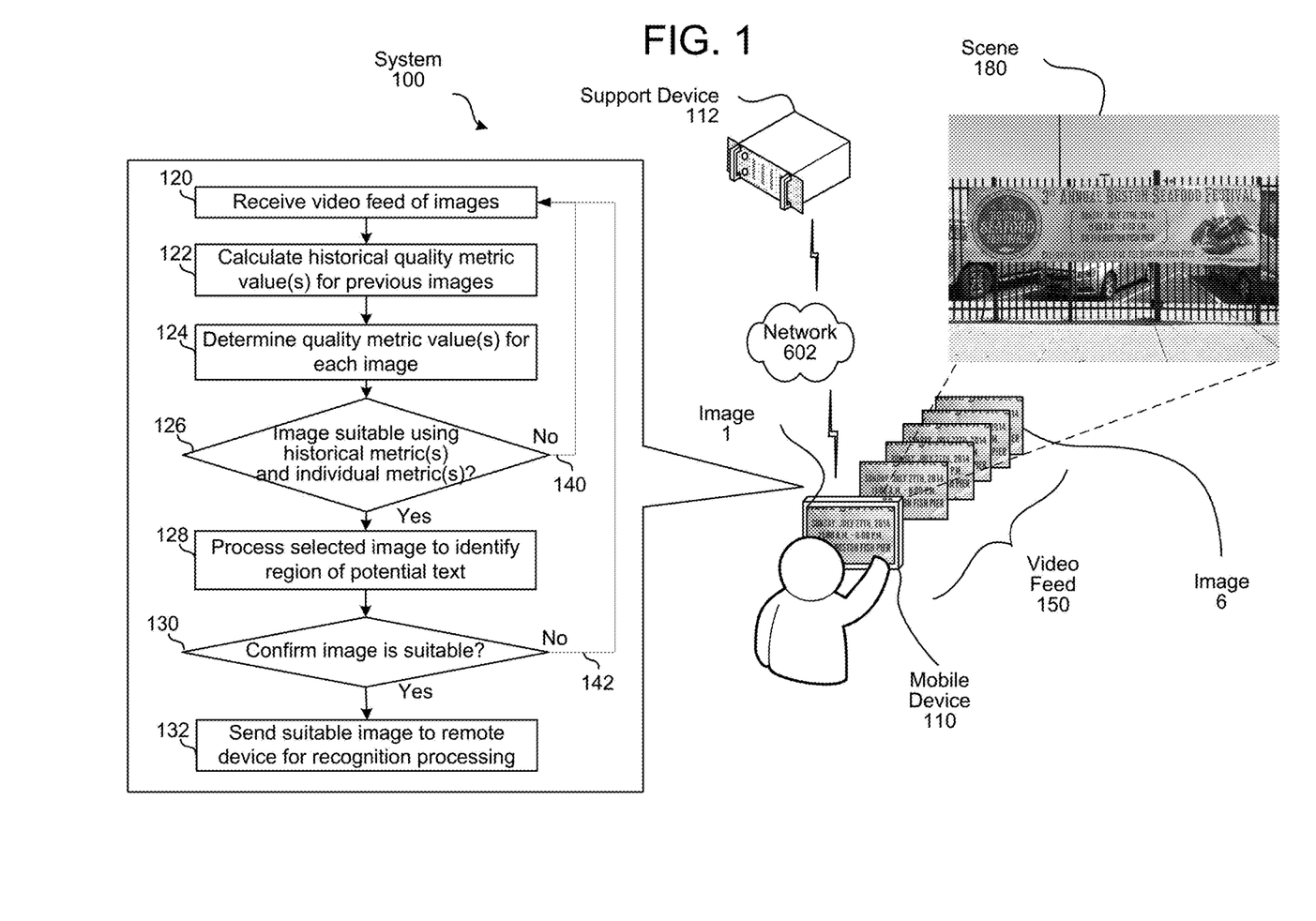
FIG. 1 illustrates a system for identifying suitable images for object recognition.

FIG. 1 illustrates a system 100 for selecting an image for object recognition using the present system. As shown, a mobile device 110 is in communication with a support device 112, such as a server, over network 602. As illustrated, the support device 112 may be remote from the mobile device 110, but may be located anywhere so long as the support device 112 is in communication with the mobile device 110. In other aspects no support device 112 may be used in the system 100, for example when the mobile device 110 performs recognition processing on its own. The mobile device 110 is equipped with a camera that captures a series of sequential images as part of a video feed 150. Each image of the video feed 150 may show, for example, a portion of scene 180 that may include an object or text for recognition. The images in the video feed 150 may be similar, but may have slight differences in terms of precise composition focus, angle, contrast, etc. As illustrated, the video feed 150 includes images 1-6, with image 1 being the first image in video feed 150 and image 6 being the last image in video feed 150. The mobile device 110 receives (120) the video feed of the images. As new images are received, the mobile device 110 calculates (122) a historical quality metric value using previously received images. The mobile device 110 also determines (124) an image quality metric value for each new image. Each historical metric value is associated with a particular image quality metric. For example, if the quality metric is focus, a particular image may be associated with an individual focus metric value and a historical focus metric value which represents the value of the focus metric for images preceding the particular image in question. Calculating a historical quality metric value and image quality metric value may be done for multiple different particular image quality metrics.

The mobile device 110 then uses the image quality metric value and historical quality metric value to determine (126) whether the image is suitable. The historical quality metric value incorporates the quality metric value for previously received images in the video feed 150. For example, when the mobile device 110 receives image 6, the mobile device 110 may use the quality metric values of images 1-5 to calculate a historical quality metric value. The mobile device 110 may then compare the quality metric value of a current image to the historical quality metric value. For example, the mobile device 110 may compare the quality metric value of image 6 to the historical quality metric value of images 1-5. Thus, using the historical quality metric value the mobile device 110 may select the current image for further processing. That is, if a quality metric value of a particular image compares favorably to the historical quality metric value (as described below), then that particular image may be selected.

As can be seen in FIG. 1, a first loop 140 may be executed by the mobile device 110. If a particular image is not selected, the first loop 140 will continue until an image is selected. As noted below, multiple images may be selected, as performing recognition processing on multiple image may improve results.

Once an image is selected, the mobile device 110 may process (128) the selected image using a variety of pre-processing steps to identify one or more regions in the image that are likely to include text. Based on the detection of such regions, and/or other considerations, the mobile device confirms (130) that the image is suitable. This processing may be part of a second loop 142, where if no such regions are detected, or if the pre-processing steps otherwise indicate the image is not likely to yield accurate recognition results, the mobile device 110 may discard the current image and continue searching for another.

When a suitable image is determined, the image is sent (132) to support device 112 for recognition processing, such as recognizing an object or text in the image, including optical character recognition (OCR) where appropriate. In certain configurations, the recognition processing may be performed by the mobile device 110 rather than the image being sent to the support device 112. Recognition results may then be determined, either directly by the mobile device 110 or in a communication from the support device 112 including the results.

As described above, to select an image for further recognition processing, a multi-phase process may be employed. The first phase selects one or more images based on historical metrics. This first phase may be referred to as a fast loop, as it may be performed within a short time frame, such as five milliseconds, in order to obtain a candidate image. The second phase employs a frame preprocessor to confirm that the selected candidate image contains indicators of a glyph (i.e., unrecognized text) or other object to be recognized. The second phase may be referred to as a slow loop, as it may be performed within several hundred milliseconds. If the second phase fails to identify the presence of glyphs, the candidate image may be disregarded and a new candidate obtained. A more detailed description of these phases follows below.

The first phase selects one or more images from the sequential images of the video feed. The selected image may then be processed for object/text recognition, or may be passed to the second phase for confirmation before the object/text recognition. A goal of the first phase is to select an image from the feed that is of sufficiently good quality that errors by the recognition process will be reduced. Such an image may have qualities such as being in focus for the object/text to be recognized, having relatively low motion (i.e., low blur that interferes with the recognition), having sufficient contrast, be of sufficient brightness, have sufficient sharpness, etc. Each of these qualities may be represented by a particular metric which quantitatively measures the particular quality of interest. Further, the quality metric for a particular image may be compared against the same metric for a group of images in the feed. This comparison is measured in a historical metric of the metric, which measures the particular image's value of the metric in question with the value of the metric for other images in the feed. The individual image metric and the historical metric may be input into a classifier (explained below) and the classifier will output a score indicating if the image is suitable for further object/text recognition processing. By selecting individual images based on historical metrics, systemic issues such as noise may be filtered out, allowing the system to more precisely select suitable images for recognition.

The metrics used to select an image may be general image quality metrics discussed above (focus, sharpness, motion, etc.) or may be customized image quality metrics. The metrics may be computed by software components or hardware components. For example, the metrics may be derived from output of device sensors such as a gyroscope, accelerometer, field sensors, inertial sensors, camera metadata, or other components, such as those discussed below in reference to FIG. 5. The metrics may thus be image based (such as a statistic derived from an image or taken from camera metadata like focal length or the like) or may be non-image based (for example, motion data derived from a gyroscope, accelerometer, GPS sensor, etc.). As images from the video feed are obtained by the system, the system, such as mobile device 102, may determine metric values for the image. One or more metrics may be determined for each image. To account for temporal fluctuation, the individual metrics for each respective image may be compared to the metric values for previous images in the image feed and thus a historical metric value for the image and the metric may be calculated. This historical metric may also be referred to as a historical metric value.

Figure 2:
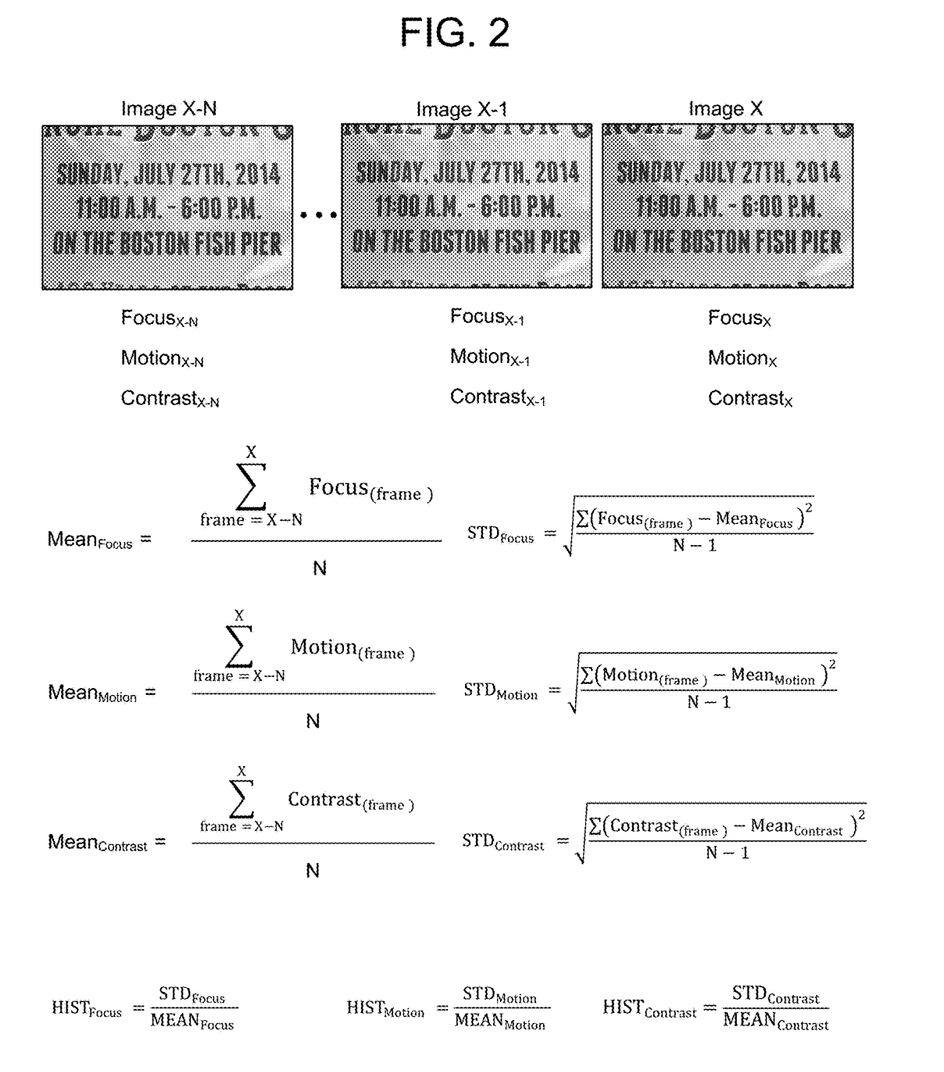
FIG. 2 illustrates metrics and historical metrics for images of a video feed.

For example, if a particular image is to be measured using a focus metric, which is a numerical representation of the focus of the image, the focus metric may also be computed for the previous N frames to the particular image. N is a configurable number and may vary depending on system constraints such as latency, accuracy, etc. For example, N may be 30 image frames, representing, for example, one second of video at a video feed of 30 frames-per-second. A mean of the focus metrics for the previous N images may be computed, along with a standard deviation for the focus metric. For example, for an image number X+1 in a video feed sequence, the previous N images, shown in FIG. 2, may have various metric values associated with each of them. In the illustration of FIG. 2, metrics focus, motion, and contrast are shown, but others are possible. A value for each metric for each of the N images may be calculated, and then from those individual values, a mean value and standard deviation value may be calculated. The mean and standard deviation (STD) may then be used to calculate a normalized historical metric value, for example STD(metric)/MEAN(metric). Thus, the value of a historical focus metric at a particular image may be the STD divided by the mean for the focus metric for the previous N frames. For example, historical metrics (HIST) for focus, motion, and contrast may be expressed as:

$$HIST_{Focus} = \frac{STD_{Focus}}{MEAN_{Focus}} \quad \text{(Equation 1)}$$

$$HIST_{Motion} = \frac{STD_{Motion}}{MEAN_{Motion}} \quad \text{(Equation 2)}$$

$$HIST_{Contrast} = \frac{STD_{Contrast}}{MEAN_{Contrast}} \quad \text{(Equation 3)}$$

In one embodiment the historical metric may be further normalized by dividing the above historical metrics by the number of frames N, particularly in situations where there are small number of frames under consideration for the particular time window. The historical metrics may be recalculated with each new image frame that is received as part of the video feed. Thus each frame of an incoming video feed may have a different historical metric from the frame before.

Figure 3A:
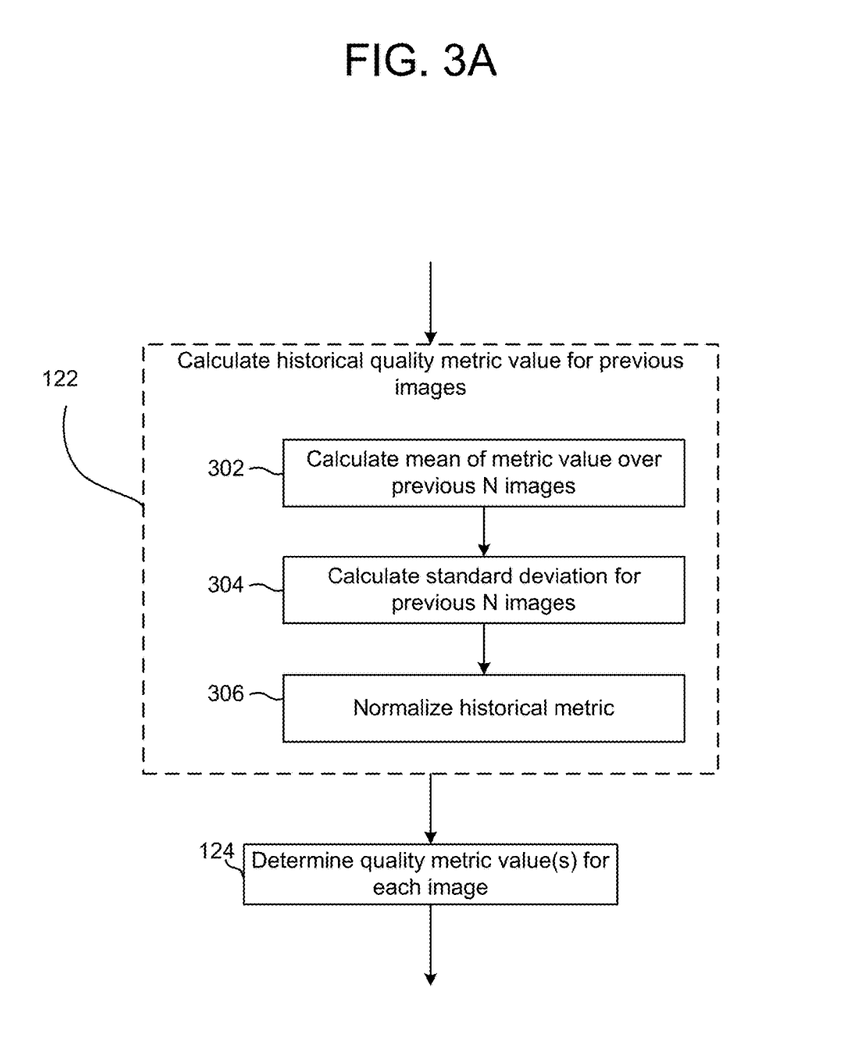
FIGS. 3A-3B illustrate a method for identifying suitable images for object recognition.

A further illustration of the process of calculating historical metrics is shown in FIG. 3A. As illustrated, calculating the historical metric value (122) may include calculating (302) the mean of a particular metric value over previous N images and calculating (304) the standard deviation for the previous N images. Steps 302 and 304 may be repeated for various metrics under consideration. Other historical metrics besides mean and standard deviation may also be computed.

Although illustrated as the most recent previous N images, there may be some intervening images between the particular image and the images used to calculate the historical metric value. The value of N may also be adjusted without latency impact, as the historical metrics may be calculated as images are received. Thus larger values of N may be used to produce results that are less sensitive to short fluctuation of metric values. While N may be the same for each metric, different values of N may be used for different metrics. In one aspect the historical metric value may be normalized (306). For example, the historical metric may be the standard deviation normalized by the mean as expressed, for example, by Equations 1-3 above.

Figure 3B:
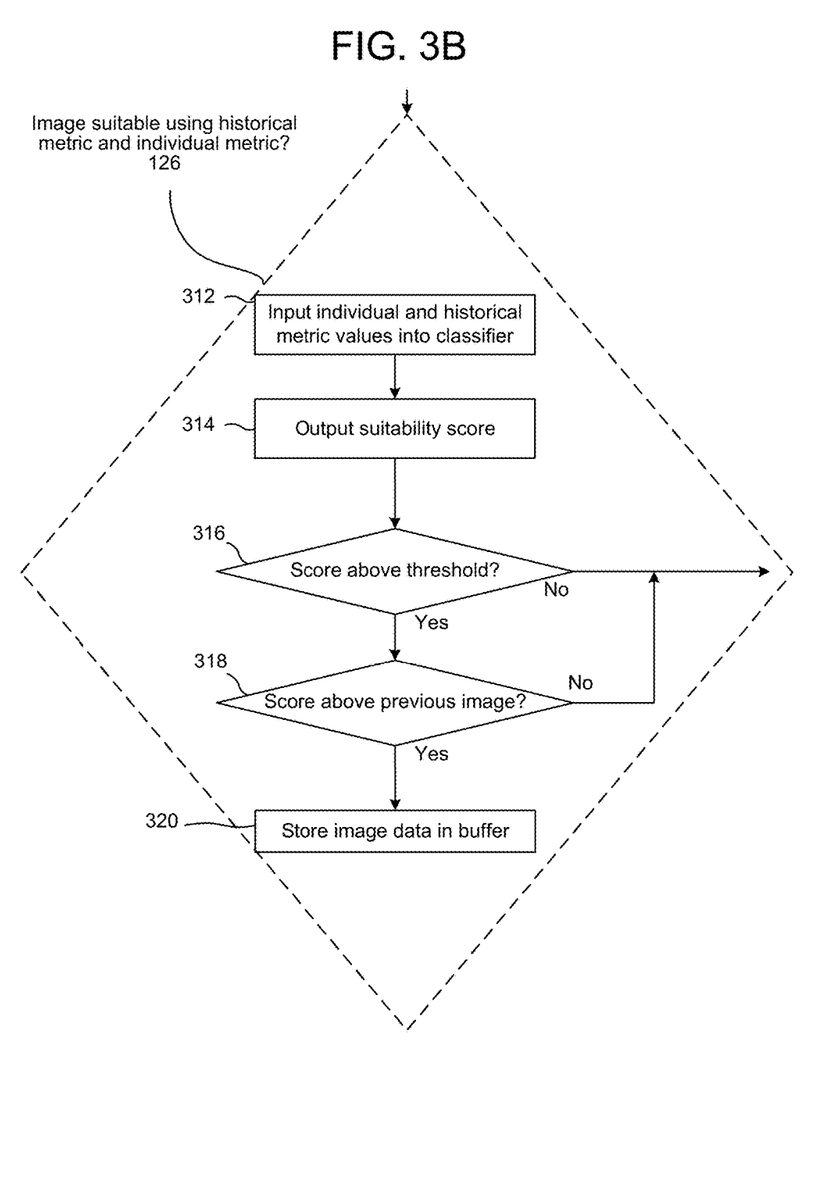

As illustrated in FIG. 3B, the metric value of the particular image and the historical metric value are then used to determine if the particular image should be selected for further recognition processing. For example, if the historical metric value is small (indicating low fluctuation between images for the values of the metric in question), then the metric may be considered relatively stable, which may be preferred for image selection. The metric value of the particular image and the historical metric value by inputting (312) both values into a classifier (i.e., a processor using a classifier model, further discussed below). The classifier may output (314) a suitability score representing the likelihood that the specific image is suitable for further recognition processing. In one aspect, a number of different metric values (and corresponding historical metric values) are processed by the classifier to determine the score. If the score passes a configured threshold (316), the individual image may be selected for further recognition processing and data corresponding to the image may be stored (320) in a buffer. The data stored may be a copy of the image or may include various data relating to the image.

The threshold may be adjusted based on different factors. It may be set to a certain level initially (based on the classifier models discussed below). If a certain period of time passes (for example a few seconds) without an image being selected for recognition, the threshold may be adjusted to allow images of lesser quality to be selected for further processing, for example the threshold may be lowered using an exponential decay technique. The system may continue to adjust the threshold as time elapses so that the system will at least begin processing some image, even if the image is of relatively poor quality. Further, the threshold may be increased once one or more suitable images are stored in the buffer. Selection of further images for the buffer may be based on an increased threshold so that only higher quality images are selected.

In addition to, or instead of comparing the image to a threshold, as new images are received, the new images may be compared (318) with the image(s) that is already stored in the buffer. If the suitability score of the new image exceeds the suitability score of an image in the buffer, the new image may replace the existing image in the buffer. If suitability scores are identical, the system may select the most recent image. To do this, each image may be associated with a timestamp indicating when the image was taken by the mobile device. The timestamp may be used to determine which image is more recent, or may be used for additional processing.

The buffer may be configured to hold a certain number of images (for example, three images). When the buffer is full, or at a different configured time, the mobile device may send the buffered images for further processing. The further processing may include preprocessing as described below.

The system may perform preprocessing prior to recognition processing. This pre-processing may be considered as part of the second phase/slow loop as discussed above. The second phase pre-processes the image(s) selected in the first phase. The pre-processing includes performing operations such as text detection, masking, binarization, etc. to determine if there are regions in the selected image that likely contain text and to prepare the image for recognition processing (either by the mobile device or by a support device). By only performing the preprocessing on images that have been selected during the first phase, the system may avoid spending computing resources on poor quality images that are unlikely to be suitable for recognition processing.

As part of the preprocessing, the system may perform various operations to identify potential locations in an image that may contain recognizable text. This process may be referred to as glyph region detection. A glyph is a text character that has yet to be recognized. If no glyphs or glyph regions have been detected in the image, the selected image may be discarded. A new image may then be selected to take its place. If a glyph region is detected, various metrics may be calculated to assist the eventual OCR process. For example, the same metrics measured in the fast loop may be recalculated for the specific glyph region. Thus, while the entire image may be of sufficiently high quality, the quality of the specific glyph region (i.e. focus, contrast, intensity, etc.) may be measured. If the glyph region is of poor quality, the image may be rejected.

In the preprocessor, a bounding box may be generated that bounds a line of text. The bounding box may bound the glyph region. Value(s) for the image/region suitability metric(s) may be calculated for the portion of the image in the bounding box. Value(s) for the same metric(s) may also be calculated for the portion of the image outside the bounding box. The value(s) for inside the bounding box may then be compared to the value(s) outside the bounding box to make another determination on the suitability of the image. This determination may also use a classifier.

Additional features may be calculated in the second phase that may assist in OCR processing. The values of these features may also be processed using a classifier to determine whether the image contains true text character/glyphs or is otherwise suitable for recognition processing. To locally classify each candidate character location as a true text character/glyph location, a set of features that capture salient characteristics of the candidate location is extracted from the local pixel pattern. A list of example characteristics that may be used for glyph classification is presented in Table 2, and will be explained in connection to FIGS. 4A to 4D.

TABLE 2

| Feature | Description |
| --- | --- |
| Aspect Ratio | (bounding box width/bounding box height) |
| Compactness | $4 * \pi *$ candidate glyph area/(perimeter)$^2$ |
| Solidity | candidate glyph area/bounding box area |
| Stroke-width to width ratio | maximum stroke width/bounding box width |
| Stroke-width to height ratio | maximum stroke width/bounding box height |
| Convexity | convex hull perimeter/perimeter |
| Raw compactness | $4 * \pi *$ (candidate glyph number of pixels)/(perimeter)$^2$ |
| Number of holes | number of holes in candidate glyph |

Figure 4A:
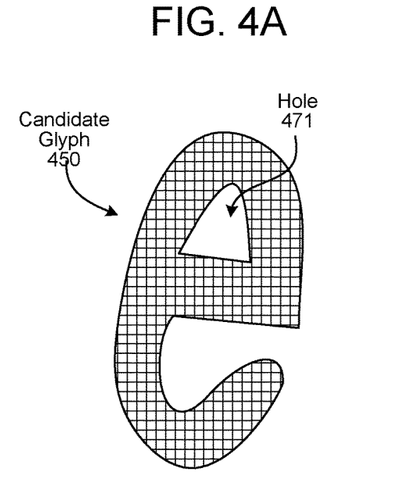
FIGS. 4A to 4D illustrate various features of an extracted candidate character that may be used to characterize the candidate character.
Figure 4B:
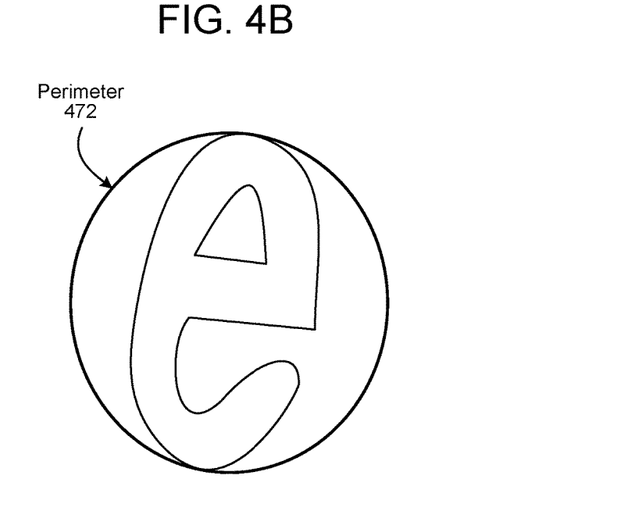

FIG. 4A illustrates an individual extracted candidate glyph 450, which includes one hole 471. The "area" of the candidate character corresponds to the shaded portion of the character 450. The "Compactness" is based on a ratio of the area of the shape to the area of a circle encompassing the shape. The "Compactness" of the candidate character is equal to four times the constant "Pi" times the area of the candidate character, divided by the square of the perimeter 472 of a circle encompassing the candidate character (illustrated in FIG. 4B). An estimate of the perimeter 472 may be determined based on a longest distance between two edges of the glyph 450. The "Solidity" of the candidate character is the area of the candidate character divided by the area of the bounding box (i.e., bounding box height times width).

Figure 4C:
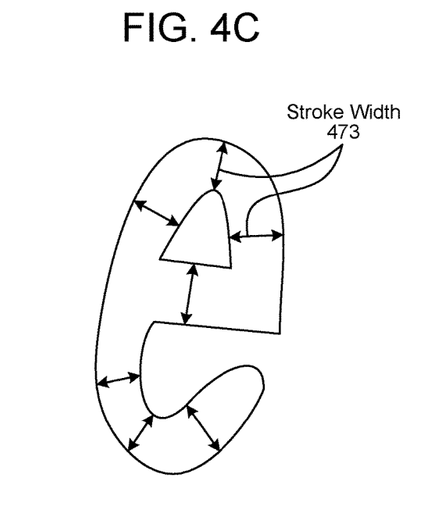
Figure 4D:
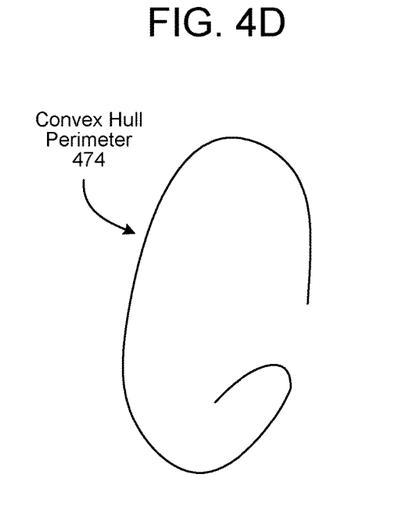

FIG. 4C illustrates various stroke widths 473 of the candidate character. One technique for measuring stroke width is to detect edges of the candidate character (e.g., using Canny edge detection), and then measure across the candidate character from one edge to an opposite edge. In particular, the measurement may be measured perpendicular to a tangent at one edge of the candidate character to a parallel tangent at an opposite edge. A maximum stoke width of the glyph is used to calculate the stroke-width to glyph-width ratio and the stroke-width to glyph-height ratio. As text characters in most languages have consistent stroke widths throughout the glyph, stroke widths 473 that exhibit significant variation (e.g., exceeding a standard deviation of all stroke widths by a threshold value) may optionally be ignored when determining the maximum stroke width for classification.

Referring back to Table 2, "Stroke-Width to Width ratio" is the maximum stroke width of a candidate character divided by the width of the character's bounding box 160. Similarly, "Stroke-Width to Height ratio" is the maximum stroke with of a candidate character divided by the height of the character's bounding box.

"Convexity" is a candidate character's convex hull perimeter 474 (illustrated in FIG. 4D) divided by the perimeter 472. The edges of a candidate character may be expressed as sequence of lines and curves. The convex hull perimeter 474 corresponds to peripheral portions of the glyph 450 that exhibit convex edges. "Raw Compactness" is equal to four times the constant Pi times the number of pixels comprising the candidate character divided by the square of the perimeter 472.

Other candidate region identification techniques may be used. For example, the system may use techniques involving maximally stable extremal regions (MSERs). Instead of MSERs (or in conjunction with MSERs), the candidate locations may be identified using histogram of oriented gradients (HoG) and Gabor features.

HoGs are feature descriptors used in computer vision and image processing for the purpose of object detection. The HoG technique counts occurrences of gradient orientation in localized portions of an image, and is similar to that of edge orientation histograms, scale-invariant feature transform descriptors, and shape contexts. However, HoG is different from these other techniques in that it is computed on a dense grid of uniformly spaced cells and uses overlapping local contrast normalization for improved accuracy. Locally-normalized HoG descriptors offer particular performance advantages relative to other existing feature sets, computed on a dense grid of uniformly spaced cells and using overlapping local contrast normalizations.

Gabor features are identified by a Gabor filter, which is a linear filter used for edge detection. Frequency and orientation representations of Gabor filters are similar to those of the human visual system, and they have been found to be particularly appropriate for texture representation and discrimination. In the spatial domain, a two-dimensional Gabor filter is a Gaussian kernel function modulated by a sinusoidal plane wave, applying image decompositions to identify and recognize objects.

The above features, as well as other metrics calculated for the image in the second phase may be fed into a classifier to determine a second phase suitability score indicating whether the image is suitable for recognition processing. This second phase suitability score may be used to confirm suitability of the selected image. If the image is confirmed to be suitable, it may be further processed, for example using techniques such as masking, binarization, etc. that assist the OCR processing. The processed image may then be sent to a support device for OCR processing (or be OCR processed by the local device).

The system may perform the above preprocessing for multiple images from a particular video feed. The multiple images may then be sent to the support device for recognition processing, where the individual images are analyzed to identify objects and/or text in the images. Processing multiple images in this manner allows the system to get several "chances" to recognized viewed objects and allows the system to be more robust than if simply a single image is analyzed. Once the images are sent, the pipeline for selecting image from the video feed may continue (in case the system cannot process the sent images) or may be suspended pending a result from the system (or an indication from the system that a result cannot be found with the current batch of images.

Various processes described above, including, in the first phase determining suitable images, and in the second phase identifying glyph regions, confirming suitability, etc. may be performed using classifiers or other machine learning techniques. For example, in the first phase the determined metrics for an individual image as well as the historical metric values may be input into a trained classifier in order to determine the first suitability score and/or whether the image under consideration is suitable. The trained classifier applies one or more adaptive models to determine if the image is suitable. The adaptive model may be stored in a database or may be integral to the classifier. The adaptive model determines whether patterns identified when the system was trained are or are not present in the input data. Examples of classifiers include Support Vector Machines (SVMs), neural networks, logistic regression, decision trees, AdaBoost (short for "Adaptive Boosting") combined with decision trees, and random forests. In some of these classifiers (e.g., neural networks), the models for different objects may not be discrete models, but rather, aspects of a single integrated model that can be used to identify a plurality of different objects For example, a support vector machine (SVM) is a supervised learning model with associated learning algorithms that analyze data and recognize patterns, such as the patterns in images, used for classification and regression analysis. Given a set of training examples, each marked as belonging to one of two categories, an SVM training algorithm builds a model that assigns new examples into one category or the other, making it a non-probabilistic binary linear classifier. An SVM model may be mapped so that the examples of the separate categories are divided by a clear gap. New examples are then mapped into that same space and predicted to belong to a category based on which side of the gap they fall on. For example, an SVM model may be used to make a binary prediction regarding image quality, specifically whether a considered image is a good image or a bad image.

To train the classifier a number of sample images of a training set are labeled, with specific metric values, historical metric values, and/or indications as to whether the specific sample image is suitable or not (i.e., a good image or not). After analyzing the many samples, a model may be constructed to evaluate input images. The model may be stored by a mobile device and then may be used during runtime to analyze images from the video feed.

A suitable image may be characterized in the training set by having metric values corresponding to a high-quality image. For example, for focus the image would be in focus, with little to no out-of-focus blur. For motion, the image is taken with no relative motion between the mobile device and objects shown in the image and has little to no motion blur. The frame intensity range should be acceptable, as in neither too dark nor too bright. The contrast should be acceptable, with little to no glare or shadow. Further, for text recognition, the image should have identifiable glyph regions for OCR processing (and those glyph regions should have sufficiently high image quality).

Figure 5:
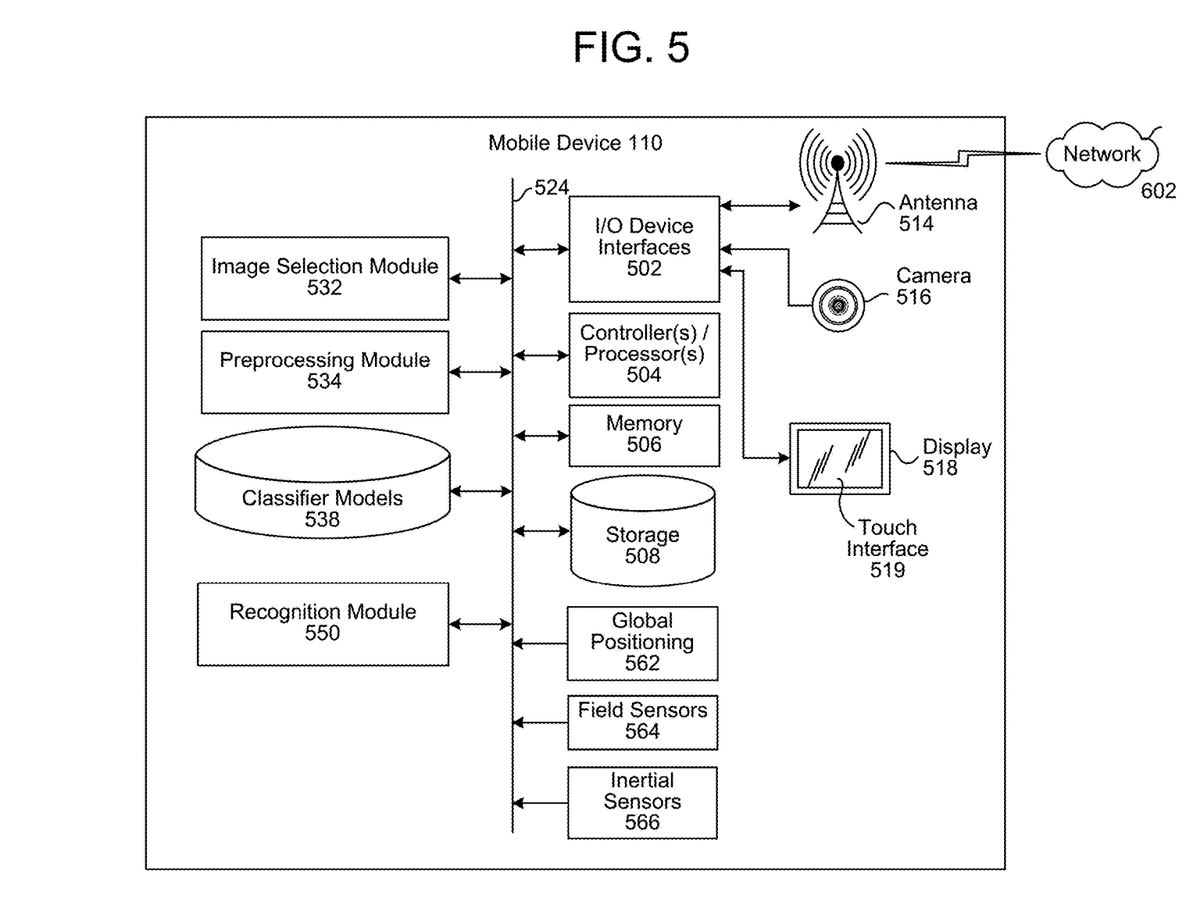
FIG. 5 is a block diagram conceptually illustrating example components of a device for identifying suitable images for object recognition.

FIG. 5 is a block diagram conceptually illustrating example components of the device 110 of the system 100. In operation, the device 110 may include computer-readable and computer-executable instructions that reside on the device 110, or that may reside on a network-connected device operating in conjunction with device 110.

As illustrated in FIG. 5, the device 110 may include wireless network radio connectivity (e.g., antenna 514), one or more cameras (516), a display 518, and a user interface such as touch interface 519. "Camera" includes image capture systems used to capture images, and includes (among other things), cameras used for photography and for the capture of video.

The display 518 may be a display of any suitable technology, such as a liquid crystal display, an organic light emitting diode display, electronic paper, an electrochromic display, or other suitable component(s). The cameras 516, display 518, and other components may be integrated into the device 110, or may be separate, connected to the device 110 by a wired or wireless connection. The device 110 may also include global positioning sensors 562, field sensors 564 (e.g., a 3-axis magnetometer, a gravity sensor), and inertial sensors 566 (e.g., a 3-axis accelerometer, a 3-axis gyroscope). The device 110 may also include one or more buttons (not shown) or other input components such as a keyboard (not shown). Several of each of these components may be included.

The global positioning module 562 provides an interface for acquiring location information, such as information from satellite geographic positioning system(s). For example, the global positioning module 562 may include a Global Positioning System (GPS) receiver and/or a Global Navigation Satellite System (GLONASS) receiver. The global positioning module 562 may also acquire location-based information using other radio sources (e.g., via antenna 514), such as mapping services that triangulate off of known WiFi service set identifiers (SSIDs) or cellular towers within range of the device 110.

The field sensor module 564 provides directional data. The field sensor module 564 may include a 3-axis magnetometer that measures magnetic fields and may serve as a compass. The field sensor module 564 may also include a dedicated gravity sensor to determine up-and-down. The inertial sensor module 566 provides inertial data, and may include 3-axis accelerometer and a 3-axis gyroscope. Examples of other sensors include an electronic thermometer to measure ambient temperature and a proximity sensor to detect whether there is an object within a certain distance of the device 110.

The device 110 may include an address/data bus 524 for conveying data among components of the device 110. Each component within the device 110 may also be directly connected to other components in addition to (or instead of) being connected to other components across the bus 524.

The device 110 may include one or more controllers/processors 504, that may each include a central processing unit (CPU) for processing data and computer-readable instructions, and a memory 506 for storing data and instructions. The memory 506 may include volatile random access memory (RAM), non-volatile read only memory (ROM), non-volatile magnetoresistive (MRAM) and/or other types of memory. The device 110 may also include a data storage component 508, for storing data and controller/processor-executable instructions (e.g., instructions to perform the processes illustrated in, and discussed in connection with, FIGS. 1 and 3A-3B). The data storage component 508 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 502. The buffer for storing image frames prior to recognition processing may be part of memory 506 or storage 508.

Computer instructions for operating the device 110 and its various components (such as modules 532, 534, and 550) may be executed by the controller(s)/processor(s) 504, using the memory 506 as temporary "working" storage at runtime. The computer instructions may be stored in a non-transitory manner in non-volatile memory 506, storage 508, or an external device. Alternatively, some or all of the executable instructions may be embedded in hardware or firmware in addition to or instead of software.

The device 110 includes input/output device interfaces 502. A variety of components may be connected through the input/output device interfaces 502, such as the display 518, a speaker (not illustrated), a microphone (not illustrated), and the user interface (e.g., touch interface 519). The input/output device interfaces 502 may also include an interface for an external peripheral device connection such as universal serial bus (USB), Thunderbolt or other connection protocol. The input/output device interfaces 502 may also include a connection to one or more networks 602 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 602, the system 100 may be distributed across a networked environment.

The device 110 further includes an image selection module 532 that may perform the processes discussed in connection with FIGS. 1 and 3A and 3B, and/or works in conjunction with another device in the system 100. For example, a first device 110 may include the camera 516 and capture the video feed image 150, whereas a second device 110 (or a support device 112 such as a server) may include all or part of the recognition module 550 that processes the selected image, such as performing OCR.

The device includes an image selection module 532. Among other things, the image selection module 532 identifies an image in the video feed and compares metrics of the image to historical metric data using classifier models 538 as part of the first phase/fast loop discussed above. If any other pre-processing of the image is performed prior to recognition (e.g., identifying potential glyph regions, masking, binarization, etc.), that preprocessing may be performed by the preprocessing module 534. The preprocessing module 534 may also may use of classifier models 538 to determine image suitability as part of the second phase/slow loop discussed above. Classifier model storage 538 may be part of storage 508.

A recognition module 550 may be configured to recognize objects and/or text within an image, for example within an image selected and pre-processed by the image selection module 532. For example, the recognition module 550 may perform optical character recognition (OCR) engine on the pre-processed image. Any OCR algorithm or algorithms may be used, as known in the art. The recognition module 550 may be located on the mobile device 110 or may be located on a support device 112.

The concepts disclosed herein may be applied within a number of different devices and computer systems, including, for example, image-scanning general-purpose computing systems, server-client computing systems, "smart" cellular telephone computing systems, personal digital assistants (PDAs), cameras, image scanners, tablet computers, wearable computing devices (glasses, etc.), other mobile devices, etc.

Figure 6:
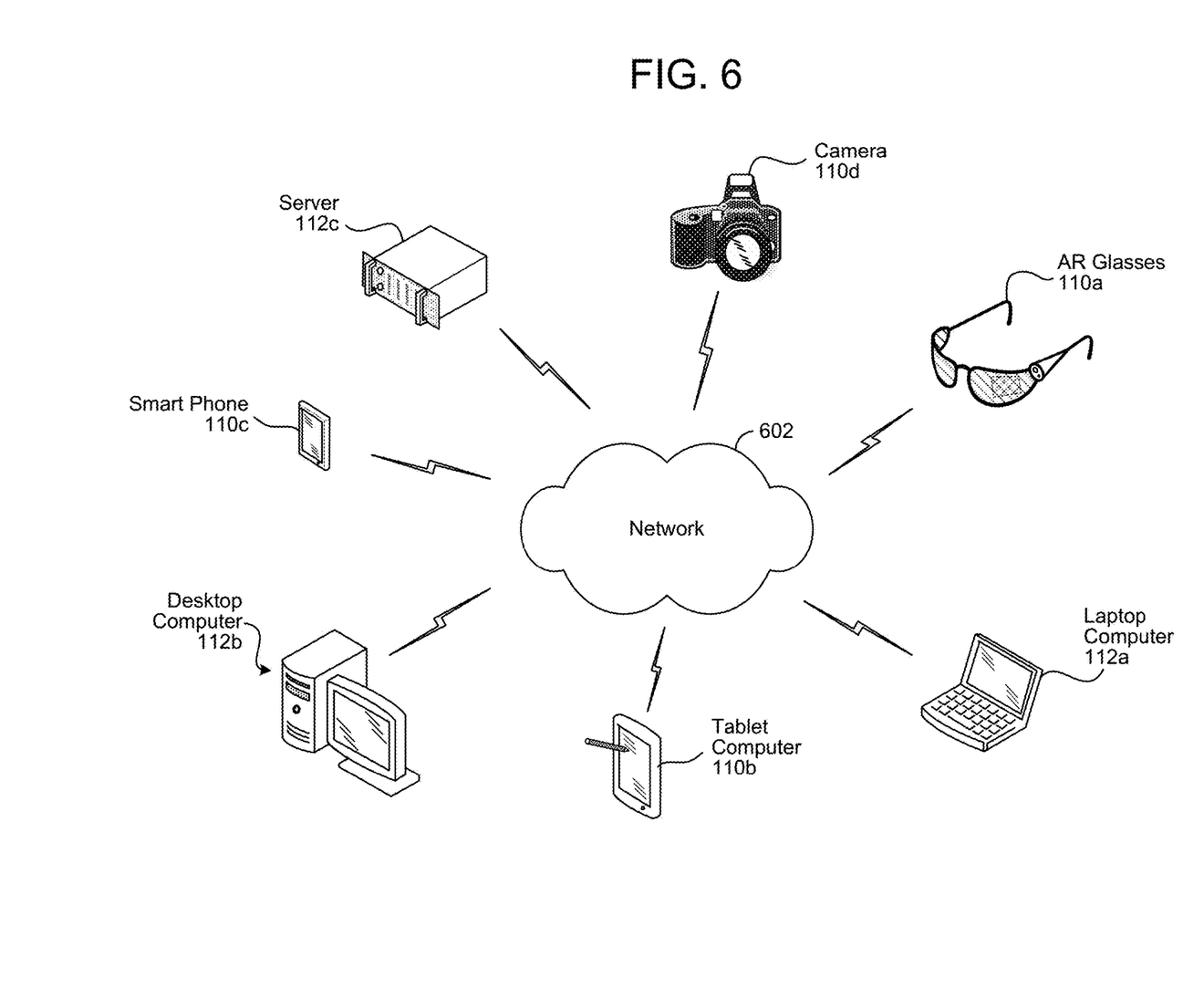
FIG. 6 illustrates an example of a computer network for use with the underline removal system.

Through the network 602, the system 100 may be distributed across a networked environment, as shown in FIG. 6. As illustrated in FIG. 6, multiple devices (110a to 110c) may contain components of the system 100 and the devices may be connected over a network 602. Network 602 may include a local or private network or may include a wide network such as the internet. Devices may be connected to the network 602 through either wired or wireless connections. For example, augmented reality (AR) glasses 110a, a tablet computer 110b, a smart phone 110c, and a camera 110d may be connected to the network 602 through a wireless service provider, over a WiFi or cellular network connection or the like. Other devices are included as network-connected support devices 112, such as a laptop computer 112a, a desktop computer 110b, and a server 112c. The support devices 112 may connect to the network 602 through a wired connection or wireless connection. Networked mobile devices 110 may capture images using one-or-more built-in or connected camera 516 or image capture devices, with image selection and/or preprocessing performed by an image selection module 532 of the same device or another device connected via network 602. Selected images may then be sent to a support device 112 for recognition processing using a recognition module 550 of the support device 112.

The above examples are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, image processing, and optical character recognition (OCR) should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more engines of the image processing module 532 may be implemented as firmware in hardware. For example, portions of the image selection module 532 may be implemented as a digital signal processor (DSP) and/or application-specific integrated circuit (ASIC).

As used in this disclosure, the term "a" or "one" may include one or more items unless specifically stated otherwise. Further, the phrase "based on" is intended to mean "based at least in part on" unless specifically stated otherwise.

What is claimed is:

1. A computing system configured to select an image for object recognition, the system comprising:
   at least one processor;
   memory including instructions which, when executed by the at least one processor, cause the system to perform a set of actions comprising:
      receiving a plurality of sequential images in a camera video feed, the plurality of sequential images comprising a first image and preceding images, the preceding images occurring in the sequential images prior to the first image;
      determining a respective value for a focus metric for each image of the plurality of sequential images, wherein the focus metric measures a respective focus level of each image;
      determining a first focus metric value for the first image;
      calculating a historical focus metric value based on a plurality of respective focus metric values for the preceding images;
      determining a respective value for a motion metric for each image of the plurality of sequential images, wherein the motion metric measures a respective motion level of each image;

determining a first motion metric value for the first image;
calculating a historical motion metric value based on a plurality of respective motion metric values for the preceding images;
computing a suitability metric value by processing the first focus metric value, the historical focus metric value, the first motion metric value, and the historical motion metric value using a classifier model, wherein the suitability metric value indicates a suitability for performing optical character recognition on the first image; and
selecting the first image for optical character recognition based at least in part on the suitability metric value.

2. The computing system of claim 1, the set of actions further comprising:
identifying a glyph region within the first image, wherein the glyph region includes text characters for optical character recognition;
determining a region focus metric value, wherein the region focus metric value measures a focus level in the glyph region;
determining a region motion metric value, wherein the region motion metric value measures an amount of motion detected in the glyph region;
processing the region focus metric value and region motion metric value using a second classifier model to obtain a second suitability metric value, wherein the second suitability metric value indicates a suitability for performing optical character recognition on the glyph region;
comparing the second suitability metric value to a second threshold,
wherein the selecting is further in response to the second suitability metric value being above the second threshold.

3. A computer-implemented method comprising:
receiving sequential images in a camera image feed, the sequential images comprising a first image and preceding images, the preceding images occurring in the sequential images prior to the first image;
determining a first focus value for the first image;
determining a plurality of respective focus values for at least a subset of the preceding images;
determining a historical focus value based on the plurality of respective focus values for at least the subset of the preceding images;
determining a first image quality value for the first image, the first image quality value based on one or more of: a first motion value, a first intensity value, a first sharpness value, or a first contrast value;
determining a plurality of respective second image quality values for at least the subset of the preceding images, a respective second image quality value based on one or more of: a respective second motion value, a respective second intensity value, a respective second sharpness value, or a respective second contrast value;
determining a historical image quality value based on the plurality of respective second image quality values for at least the subset of the preceding images;
processing at least the first focus value, the historical focus value, the first image quality value, and the historical image quality value using a classifier; and
selecting the first image for at least one of character recognition processing or object recognition processing based on an output from the classifier.

4. The computer-implemented method of claim 3, further comprising:
identifying a glyph region within the first image, wherein the glyph region includes text characters for optical character recognition; and
determining a region quality metric value for the glyph region,
wherein the selecting is further based on the region quality metric value.

5. The computer-implemented method of claim 3, wherein the classifier uses at least one of the following techniques: support vector machines, neural networks, logistic regression, decision trees, random forest, or adaptive boosting.

6. The computer-implemented method of claim 3, further comprising:
determining a mean value using the plurality of respective focus values; and
determining a standard deviation value using the plurality of respective focus values,
wherein the historical focus value is determined based on the mean value and the standard deviation value.

7. The computer-implemented method of claim 6, wherein the historical focus value is the standard deviation value divided by the mean value.

8. The computer-implemented method of claim 3, further comprising determining a suitability focus value based on the first focus value and the historical focus value, wherein:
the suitability focus value indicates a suitability for performing recognition processing on the first image; and
selecting the first image is further based on the suitability focus value.

9. The computer-implemented method of claim 8, further comprising:
determining a second suitability focus value for a second image in the sequential images; and
comparing the suitability focus value to the second suitability focus value,
wherein selecting the first image is further based on comparing the suitability focus value to the second suitability focus value.

10. A computing device comprising:
at least one processor;
memory including instructions which, when executed by the at least one processor, cause the device to perform a set of actions comprising:
receiving sequential images in a camera image feed, the sequential images comprising a first image and preceding images, the preceding images occurring in the sequential images prior to the first image;
determining a first focus value for the first image;
determining a plurality of respective focus values for at least a subset of the preceding images;
determining a historical focus value based on the plurality of respective focus values for at least the subset of the preceding images;
determining a first image quality value for the first image, the first image quality value based on one or more of: a first motion value, a first intensity value, a first sharpness value, or a first contrast value;
determining a plurality of respective second image quality values for at least the subset of the preceding images, a respective second image quality value based on one or more of: a respective second motion value, a respective second intensity value, a respective second sharpness value, or a respective second contrast value;

determining a historical image quality value based on the plurality of respective second image quality values for at least the subset of the preceding images;

processing at least the first focus value, the historical focus value, the first image quality value, and the historical image quality value using a classifier; and selecting the first image for at least one of character recognition processing or object recognition processing based on an output from the classifier.

11. The computing device of claim 10, the set of actions further comprising:

identifying a glyph region within the first image, wherein the glyph region includes text characters for optical character recognition; and determining a region quality metric value for the glyph region, wherein the selecting is further based on the region quality metric value.

12. The computing device of claim 10, wherein the classifier uses at least one of the following techniques: support vector machines, neural networks, logistic regression, decision trees, random forest, or adaptive boosting.

13. The computing device of claim 10, the set of actions further comprising:

determining a mean value using the plurality of respective focus values; and determining a standard deviation value using the plurality of respective focus values, wherein the historical focus value is determined based on the mean value and the standard deviation value.

14. The computing device of claim 13 wherein the historical focus value is the standard deviation value divided by the mean value.

15. The computing device of claim 10, the set of actions further comprising determining a suitability focus value based on the first focus value and the historical focus value, wherein:

the suitability focus value indicates a suitability for performing recognition processing on the first image; and selecting the first image is further based on the suitability focus value.

16. The computing device of claim 15, the set of actions further comprising:

determining a second suitability focus value for a second image in the sequential images; and comparing the suitability focus value to the second suitability focus value, wherein selecting the first image is further based on comparing the suitability focus value to the second suitability focus value.

* * * * *